United States Patent
Patrick et al.

(10) Patent No.: US 6,362,718 B1
(45) Date of Patent: Mar. 26, 2002

(54) MOTIONLESS ELECTROMAGNETIC GENERATOR

(76) Inventors: Stephen L. Patrick, 2511 Woodview Dr. SE.; Thomas E. Bearden, 2211 Cove Rd., both of Huntsville, AL (US) 35801; James C. Hayes, 16026 Deaton Dr. SE., Huntsville, AL (US) 35803; Kenneth D. Moore, 1704 Montdale Rd., Huntsville, FL (US) 35801; James L. Kenny, 925 Tascosa Dr., Huntsville, AL (US) 35802

(*) Notice: Subject to any disclaimer, the term of this patent is extended or adjusted under 35 U.S.C. 154(b) by 0 days.

(21) Appl. No.: 09/656,313

(22) Filed: Sep. 6, 2000

(51) Int. Cl.[7] .............................................. H01F 27/24
(52) U.S. Cl. ..................................................... 336/214
(58) Field of Search ............................. 363/16, 24, 25, 363/26, 56.06, 56.08, 133, 134; 336/15, 110, 155, 177, 180, 213, 214, 221, 222

(56) References Cited

U.S. PATENT DOCUMENTS

| | | | |
|---|---|---|---|
| 2,153,378 A | 4/1939 | Kramer | 171/95 |
| 2,892,155 A | 6/1959 | Radus et al. | 324/117 |
| 3,079,535 A | 2/1963 | Schultz | 317/201 |
| 3,165,723 A | 1/1965 | Radus | 340/174 |
| 3,228,013 A | 1/1966 | Olson et al. | 340/174 |
| 3,254,268 A | 5/1966 | Radus et al. | 317/14 |
| 3,316,514 A | 4/1967 | Radus et al. | 335/291 |
| 3,368,141 A | 2/1968 | Subieta-Garron | 323/44 |
| 3,391,358 A | 7/1968 | Bratkowski et al. | 335/21 |
| 3,453,876 A | 7/1969 | Radus | 73/141 |
| 3,517,300 A * | 6/1970 | McMurray | |
| 3,569,947 A | 3/1971 | Radus | 340/174 |
| 3,599,074 A * | 8/1971 | Adams | |
| 4,006,401 A | 2/1977 | de Rivas | 323/92 |
| 4,077,001 A | 2/1978 | Richardson | 323/92 |
| 4,366,532 A | 12/1982 | Rosa et al. | 363/69 |
| 4,482,945 A | 11/1984 | Wolf et al. | 363/129 |
| 4,554,524 A | 11/1985 | Radus | 337/3 |
| 4,853,668 A | 8/1989 | Bloom | 336/214 |
| 4,864,478 A | 9/1989 | Bloom | 363/16 |
| 4,904,926 A | 2/1990 | Pasichinskyj | 323/362 |
| 5,011,821 A | 4/1991 | McCullough | 505/1 |
| 5,221,892 A | 6/1993 | Sullivan et al. | 323/362 |
| 5,245,521 A * | 9/1993 | Spreen | 363/37 |
| 5,327,015 A | 7/1994 | Hacket | 505/211 |
| 5,335,163 A | 8/1994 | Seiersen | 363/126 |
| 5,694,030 A * | 12/1997 | Sato et al. | 323/282 |

OTHER PUBLICATIONS

Raymond J. Radus, "Permanent–Magnet Circuit using a 'Flux–Transfer' Principle," Engineers' Digest, 24(1–6) Jan.–Jun. 1963, p. 86.

Robert O'Handley, Modern Magnetic Materials, Principles and Applications, John Wiley & Sons, Inc., 2000, pp. 456–468.

Robert C. Weast, Editor, CRC Handbook of Chemistry and Physics, 1978–1979, p. B–50.

Honeywell.com web site, "amorphous metals".

* cited by examiner

Primary Examiner—Matthew Nguyen
(74) Attorney, Agent, or Firm—Norman Friedland

(57) ABSTRACT

An electromagnetic generator without moving parts includes a permanent magnet and a magnetic core including first and second magnetic paths. A first input coil and a first output coil extend around portions of the first magnetic path, while a second input coil and a second output coil extend around portions of the second magnetic path. The input coils are alternatively pulsed to provide induced current pulses in the output coils. Driving electrical current through each of the input coils reduces a level of flux from the permanent magnet within the magnet path around which the input coil extends. In an alternative embodiment of an electromagnetic generator, the magnetic core includes annular spaced-apart plates, with posts and permanent magnets extending in an alternating fashion between the plates. An output coil extends around each of these posts. Input coils extending around portions of the plates are pulsed to cause the induction of current within the output coils.

29 Claims, 5 Drawing Sheets

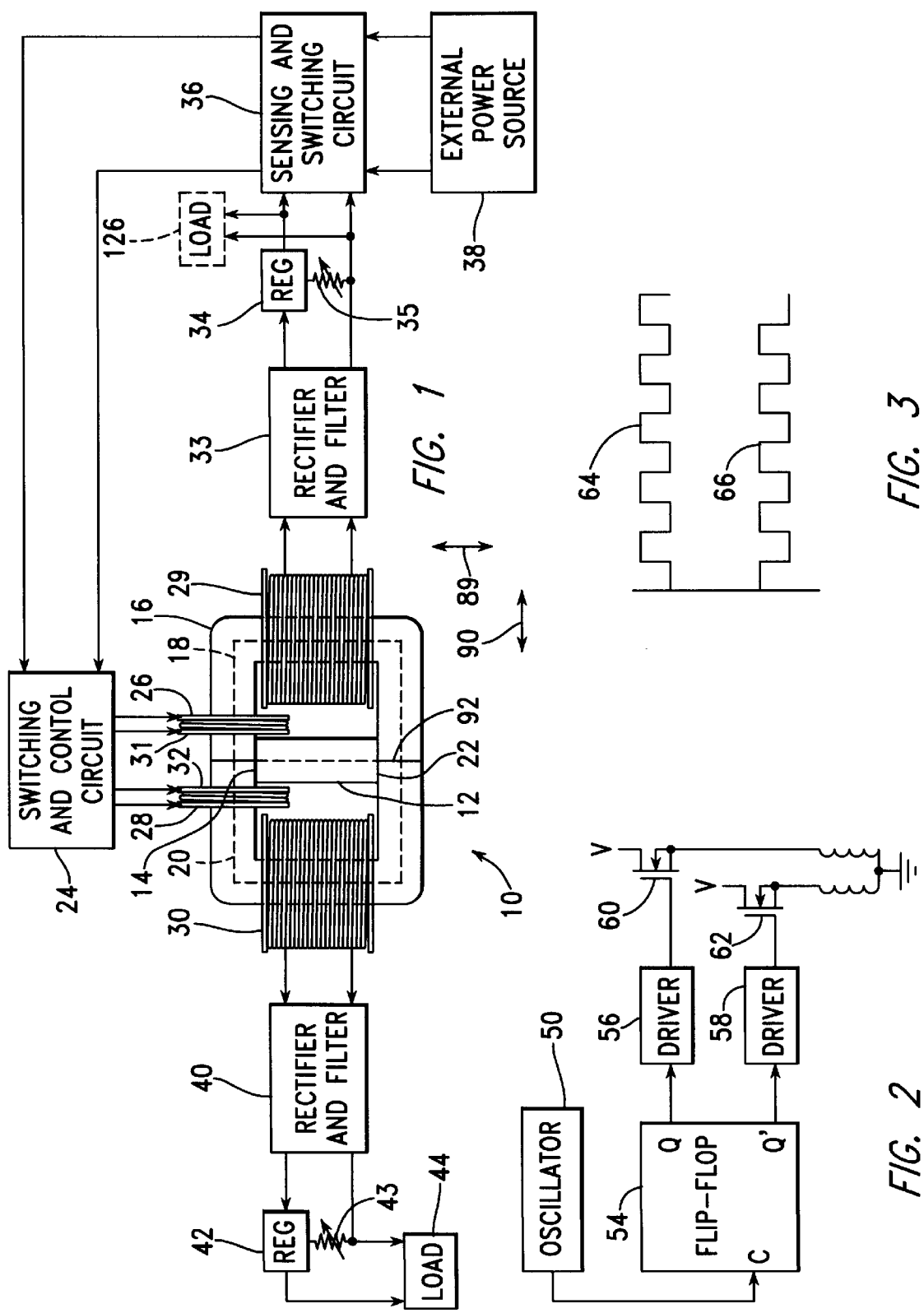

MOTIONLESS ELECTROMAGNETIC GENERATOR

BACKGROUND INFORMATION

1. Field of Invention

This invention relates to a magnetic generator used to produce electrical power without moving parts, and, more particularly, to such a device having a capability, when operating, of producing electrical power without an external application of input power through input coils.

2. Description of the Related Art

The patent literature describes a number of magnetic generators, each of which includes a permanent magnet, two magnetic paths external to the permanent magnet, each of which extends between the opposite poles of the permanent magnet, switching means for causing magnetic flux to flow alternately along each of the two magnetic paths, and one or more output coils in which current is induced to flow by means of changes in the magnetic field within the device. These devices operate in accordance with an extension of Faraday's Law, indicating that an electrical current is induced within a conductor within a changing magnetic field, even if the source of the magnetic field is stationary.

A method for switching magnetic flux to flow predominantly along either of two magnetic paths between opposite poles of a permanent magnet is described as a "flux transfer" principle by R. J. Radus in *Engineer's Digest*, Jul. 23, 1963. This principle is used to exert a powerful magnetic force at one end of both the north and south poles and a very low force at the other end, without being used in the construction of a magnetic generator. This effect can be caused mechanically, by keeper movement, or electrically, by driving electrical current through one or more control windings extending around elongated versions of the pole pieces 14. Several devices using this effect are described in U.S. Pat. Nos. 3,165,723, 3,228,013, and 3,316,514, which are incorporated herein by reference.

Another step toward the development of a magnetic generator is described in U.S. Pat. No. 3,368,141, which is incorporated herein by reference, as a device including a permanent magnet in combination with a transformer having first and second windings about a core, with two paths for magnetic flux leading from each pole of the permanent magnet to either end of the core, so that, when an alternating current induces magnetic flux direction changes in the core, the magnetic flux from the permanent magnet is automatically directed through the path which corresponds with the direction taken by the magnetic flux through the core due to the current. In this way, the magnetic flux is intensified. This device can be used to improve the power factor of a typically inductively loaded alternating current circuit.

Other patents describe magnetic generators in which electrical current from one or more output coils is described as being made available to drive a load, in the more conventional manner of a generator. For example, U.S. Pat. No. 4,006,401, which is incorporated herein by reference, describes an electromagnetic generator including permanent magnet and a core member, in which the magnetic flux flowing from the magnet in the core member is rapidly alternated by switching to generate an alternating current in a winding on the core member. The device includes a permanent magnet and two separate magnetic flux circuit paths between the north and south poles of the magnet. Each of the circuit paths includes two switching means for alternately opening and closing the circuit paths, generating an alternating current in a winding on the core member. Each of the switching means includes a switching magnetic circuit intersecting the circuit path, with the switching magnetic circuit having a coil through which current is driven to induce magnetic flux to saturate the circuit path extending to the permanent magnet. Power to drive these coils is derived directly from the output of a continuously applied alternating current source. What is needed is an electromagnetic generator not requiring the application of such a current source.

U.S. Pat. No. 4,077,001, which is incorporated herein by reference, describes a magnetic generator, or dc/dc converter, comprising a permanent magnet having spaced-apart poles and a permanent magnetic field extending between the poles of the magnet. A variable-reluctance core is disposed in the field in fixed relation to the magnet and the reluctance of the core is varied to cause the pattern of lines of force of the magnetic field to shift. An output conductor is disposed in the field in fixed relation to the magnet and is positioned to be cut by the shifting lines of permanent magnetic force so that a voltage is induced in the conductor. The magnetic flux is switched between alternate paths by means of switching coils extending around portions of the core, with the flow of current being alternated between these switching coils by means of a pair of transistors driven by the outputs of a flip-flop. The input to the flip flop is driven by an adjustable frequency oscillator. Power for this drive circuit is supplied through an additional, separate power source. What is needed is a magnetic generator not requiring the application of such a power source.

U.S. Pat. No. 4,904,926, which is incorporated herein by reference, describes another magnetic generator using the motion of a magnetic field. The device includes an electrical winding defining a magnetically conductive zone having bases at each end, the winding including elements for the removing of an induced current therefrom. The generator further includes two pole magnets, each having a first and a second pole, each first pole in magnetic communication with one base of the magnetically conductive zone. The generator further includes a third pole magnet, the third pole magnet oriented intermediately of the first poles of the two pole electromagnets, the third pole magnet having a magnetic axis substantially transverse to an axis of the magnetically conductive zone, the third magnet having a pole nearest to the conductive zone and in magnetic attractive relationship to the first poles of the two pole electromagnets, in which the first poles thereof are like poles. Also included in the generator are elements, in the form of windings, for cyclically reversing the magnetic polarities of the electromagnets. These reversing means, through a cyclical change in the magnetic polarities of the electromagnets, cause the magnetic flux lines associated with the magnetic attractive relationship between the first poles of the electromagnets and the nearest pole of the third magnet to correspondingly reverse, causing a wiping effect across the magnetically conductive zone, as lines of magnetic flux swing between respective first poles of the two electromagnets, thereby inducing electron movement within the output windings and thus generating a flow of current within the output windings.

U.S. Pat. No. 5,221,892, which is incorporated herein by reference, describes a magnetic generator in the form of a direct current flux compression transformer including a magnetic envelope having poles defining a magnetic axis and characterized by a pattern of magnetic flux lines in polar symmetry about the axis. The magnetic flux lines are spatially displaced relative to the magnetic envelope using control elements which are mechanically stationary relative to the core. Further provided are inductive elements which are also mechanically stationary relative to the magnetic envelope. Spatial displacement of the flux relative to the inductive elements causes a flow of electrical current. Further provided are magnetic flux valves which provide for the varying of the magnetic reluctance to create a time domain pattern of respectively enhanced and decreased magnetic reluctance across the magnetic valves, and, thereby, across the inductive elements.

Other patents describe devices using superconductive elements to cause movement of the magnetic flux. These devices operate in accordance with the Meissner effect, which describes the expulsion of magnetic flux from the interior of a superconducting structure as the structure undergoes the transition to a superconducting phase. For example, U.S. Pat. No. 5,011,821, which is incorporated herein by reference, describes an electric power generating device including a bundle of conductors which are placed in a magnetic field generated by north and south pole pieces of a permanent magnet. The magnetic field is shifted back and forth through the bundle of conductors by a pair of thin films of superconductive material. One of the thin films is placed in the superconducting state while the other thin film is in a non-superconducting state. As the states are cyclically reversed between the two films, the magnetic field is deflected back and forth through the bundle of conductors.

U.S. Pat. No. 5,327,015, which is incorporated herein by reference, describes an apparatus for producing an electrical impulse comprising a tube made of superconducting material, a source of magnetic flux mounted about one end of the tube, a means, such as a coil, for intercepting the flux mounted along the tube, and a means for changing the temperature of the superconductor mounted about the tube. As the tube is progressively made superconducting, the magnetic field is trapped within the tube, creating an electrical impulse in the means for intercepting. A reversal of the superconducting state produces a second pulse.

None of the patented devices described above use a portion of the electrical power generated within the device to power the reversing means used to change the path of magnetic flux. Thus, like conventional rotary generators, these devices require a steady input of power, which may be in the form of electrical power driving the reversing means of one of these magnetic generators or the torque driving the rotor of a conventional rotary generator. Yet, the essential function of the magnetic portion of an electrical generator is simply to switch magnetic fields in accordance with precise timing. In most conventional applications of magnetic generators, the voltage is switched across coils, creating magnetic fields in the coils which are used to override the fields of permanent magnets, so that a substantial amount of power must be furnished to the generator to power the switching means, reducing the efficiency of the generator.

Recent advances in magnetic material, which have particularly been described by Robert C. O'Handley in *Modern Magnetic Materials, Principles and Applications*, John Wiley & Sons, New York, pp. 456–468, provide nanocrystalline magnetic alloys, which are particularly well suited forth rapid switching of magnetic flux. These alloys are primarily composed of crystalline grains, or crystallites, each of which has at least one dimension of a few nanometers. Nanocrystalline materials may be made by heat-treating amorphous alloys which form precursors for the nanocrystalline materials, to which insoluble elements, such as copper, are added to promote massive nucleation, and to which stable, refractory alloying materials, such as niobium or tantalum carbide are added to inhibit grain growth. Most of the volume of nanocrystalline alloys is composed of randomly distributed crystallites having dimensions of about 2–40 nm. These crystallites are nucleated and grown from an amorphous phase, with insoluble elements being rejected during the process of crystallite growth. In magnetic terms, each crystallite is a single-domain particle. The remaining volume of nanocrystalline alloys is made up of an amorphous phase in the form of grain boundaries having a thickness of about 1 nm.

Magnetic materials having particularly useful properties are formed from an amorphous Co—Nb—B (cobalt-niobium-boron) alloy having near-zero magnetostriction and relatively strong magnetization, as well as good mechanical strength and corrosion resistance. A process of annealing this material can be varied to change the size of crystallites formed in the material, with a resulting strong effect on DC coercivity. The precipitation of nanocrystallites also enhances AC performance of the otherwise amorphous alloys.

Other magnetic materials are formed using iron-rich amorphous and nanocrystalline alloys, which generally show larger magnetization that the alloys based on cobalt. Such materials are, for example, Fe—B—Si—Nb—Cu (iron-boron-silicon-niobium-copper) alloys. While the permeability of iron-rich amorphous alloys is limited by their relatively large levels of magnetostriction, the formation of a nanocrystalline material from such an amorphous alloy dramatically reduces this level of magnetostriction, favoring easy magnetization.

Advances have also been made in the development of materials for permanent magnets, particularly in the development of materials including rare earth elements. Such materials include samarium cobalt, $SmCo_5$, which is used to form a permanent magnet material having the highest resistance to demagnetization of any known material. Other magnetic materials are made, for example, using combinations of iron, neodymium, and boron.

SUMMARY OF THE INVENTION

It is a first objective of the present invention to provide a magnetic generator which a need for an external power source during operation of the generator is eliminated.

It is a second objective of the present invention to provide a magnetic generator in which a magnetic flux path is changed without a need to overpower a magnetic field to change its direction.

It is a third objective of the present invention to provide a magnetic generator in which the generation of electricity is accomplished without moving parts.

In the apparatus of the present invention, the path of the magnetic flux from a permanent magnet is switched in a manner not requiring the overpowering of the magnetic fields. Furthermore, a process of self-initiated iterative switching is used to switch the magnetic flux from the permanent magnet between alternate magnetic paths within the apparatus, with the power to operate the iterative switching being provided through a control circuit consisting of components known to use low levels of power. With self-switching, a need for an external power source during operation of the generator is eliminated, with a separate power source, such as a battery, being used only for a very short time during start-up of the generator.

According to a first aspect of the present invention, an electromagnetic generator is provided, including a permanent magnet, a magnetic core, first and second input coils, first and second output coils, and a switching circuit. The permanent magnet has magnetic poles at opposite ends. The magnetic core includes a first magnetic path, around which the first input and output coils extend, and a second magnetic path, around which the second input and output coils extend, between opposite ends of the permanent magnet. The switching circuit drives electrical current alternately through the first and second input coils. The electrical current driven through the first input oil causes the first input coil to produce a magnetic field opposing a concentration of magnetic flux from the permanent magnet within the first magnetic path. The electrical current driven through the second input coil causes the second input coil to produce a magnetic field opposing a concentration of magnetic flux from the permanent magnet within the second magnetic path.

According to another aspect of the present invention, an electromagnetic generator is provided, including a magnetic core, a plurality of permanent magnets, first and second pluralities of input coils, a plurality of output coils, and a switching circuit. The magnetic core includes a pair of spaced-apart plates, each of which has a central aperture, and first and second pluralities of posts extending between the spaced-apart plates. The permanent magnets each extend between the pair of spaced apart plates. Each permanent magnet has magnetic poles at opposite ends, with the magnetic fields of all the permanent magnets being aligned to extend in a common direction. Each input coil extends around a portion of a plate within the spaced-apart plates, between a post and a permanent magnet. An output coil extends around each post. The switching circuit drives electrical current alternately through the first and second pluralities of input coils. Electrical current driven through each input coil in the first plurality of input coils causes an increase in magnetic flux within each post within the first plurality of posts from permanent magnets on each side of the post and a decrease in magnetic flux within each post within the second plurality of posts from permanent magnets on each side of the post. Electrical current driven through each input coil in the second plurality of input coils causes a decrease in magnetic flux within each post within the first plurality of posts from permanent magnets on each side of the post and an increase in magnetic flux within each post within the second plurality of posts from permanent magnets on each side of the post.

BRIEF DESCRIPTION OF THE DRAWINGS

FIG. 1 is a partly schematic front elevation of a magnetic generator and associated electrical circuits built in accordance with a first version of the first embodiment of the present invention;

FIG. 2 is a schematic view of a first version of a switching and control circuit within the associated electrical circuits of FIG. 1;

FIG. 3 is a graphical view of drive signals produced within the circuit of FIG. 2;

DETAILED DESCRIPTION OF THE INVENTION

Figure 4:
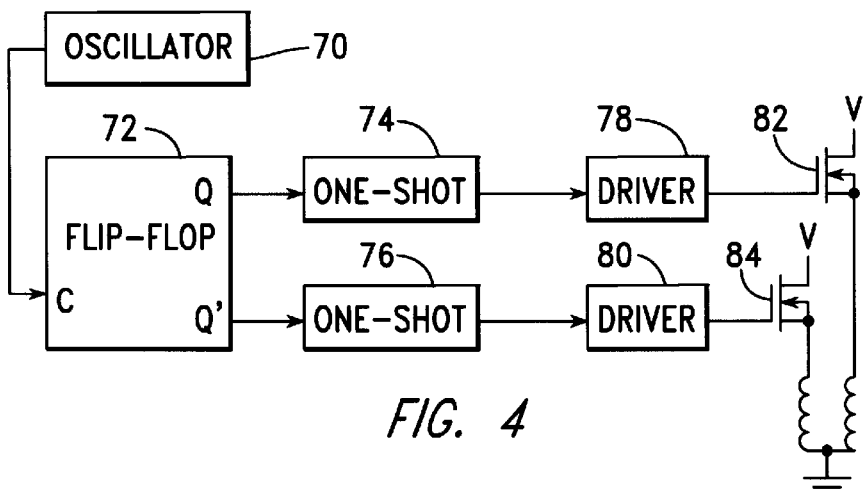
FIG. 4 is a schematic view of a second version of a switching and control circuit within the associated electrical circuits of FIG. 1.

FIG. 1 is a partly schematic front elevation of an electromagnetic generator 10, built in accordance with a first embodiment of the present invention to include a permanent magnet 12 to supply input lines of magnetic flux moving from the north pole 14 of the magnet 12 outward into magnetic flux path core material 16. The flux path core material 16 is configured to form a right magnetic path 18 and a left magnetic path 20, both of which extend externally between the north pole 14 and the south pole 22 of the magnet 12. The electromagnetic generator 10 is driven by means of a switching and control circuit 24, which alternately drives electrical current through a right input coil 26 and a left input coil 28. These input coils 26, 28 each extend around a portion of the core material 16, with the right input coil 26 surrounding a portion of the right magnetic path 18 and with the left input coil 28 surrounding a portion of the left magnetic path 20. A right output coil 29 also surrounds a portion of the right magnetic path 18, while a left output coil 30 surrounds a portion of the left magnetic path 20.

In accordance with a preferred version of the present invention, the switching and control circuit 24 and the input coils 26, 28 are arranged so that, when the right input coil 26 is energized, a north magnetic pole is present at its left end 31, the end closest to the north pole 14 of the permanent magnet 12, and so that, when the left input coil 28 is energized, a north magnetic pole is present at its right end 32, which is also the end closest to the north pole 14 of the permanent magnet 12. Thus, when the right input coil 26 is magnetized, magnetic flux from the permanent magnet 12 is repelled from extending through the right input coil 26. Similarly, when the left input coil 28 is magnetized, magnetic flux from the permanent magnet 12 is repelled from extending through the left input coil 28.

Thus, it is seen that driving electrical current through the right input coil 26 opposes a concentration of flux from the permanent magnet 12 within the right magnetic path 18, causing at least some of this flux to be transferred to the left magnetic path 20. On the other hand, driving electrical current through the left input coil 28 opposes a concentration of flux from the permanent magnet 12 within the left magnetic path 20, causing at least some of this flux to be transferred to the right magnetic path 18.

While in the example of FIG. 1, the input coils 26, 28 are placed on either side of the north pole of the permanent magnet 12, being arranged along a portion of the core 16 extending from the north pole of the permanent magnet 12, it is understood that the input coils 26, 28 could as easily be alternately placed on either side of the south pole of the permanent magnet 12, being arranged along a portion of the core 16 extending from the south pole of the permanent magnet 12, with the input coils 26, 28 being wired to form, when energized, magnetic fields having south poles directed toward the south pole of the permanent magnet 12. In general, the input coils 26, 28 are arranged along the magnetic core on either side of an end of the permanent magnet forming a first pole, such as a north pole, with the input coils being arranged to produce magnetic fields of the polarity of the first pole directed toward the first pole of the permanent magnet.

Further in accordance with a preferred version of the present invention, the input coils 26, 28 are never driven with so much current that the core material 16 becomes saturated. Driving the core material 16 to saturation means that subsequent increases in input current can occur without effecting corresponding changes in magnetic flux, and therefore that input power can be wasted. In this way, the apparatus of the present invention is provided with an advantage in terms of the efficient use of input power over the apparatus of U.S. Pat. No. 4,000,401, in which a portion both ends of each magnetic path is driven to saturation to block flux flow. In the electromagnetic generator 10, the switching of current flow within the input coils 26, 28 does not need to be sufficient to stop the flow of flux in one of the magnetic paths 18, 20 while promoting the flow of magnetic flux in the other magnetic path. The electromagnetic generator 10 works by changing the flux pattern; it does not need to be completely switched from one side to another.

Experiments have determined that this configuration is superior, in terms of the efficiency of using power within the input coils 26, 28 to generate electrical power within the output coils 29, 30, to the alternative of arranging input coils and the circuits driving them so that flux from the permanent magnet is driven through the input coils as they are energized. This arrangement of the present invention provides a significant advantage over the prior-art methods shown, for example, in U.S. Pat. No. 4,077,001, in which the magnetic flux is driven through the energized coils.

The configuration of the present invention also has an advantage over the prior-art configurations of U.S. Pat. Nos. 3,368,141 and 4,077,001 in that the magnetic flux is switched between two alternate magnetic paths 18, 20 with only a single input coil 26, 28 surrounding each of the alternate magnetic paths. The configurations of U.S. Pat. Nos. 3,368,141 and 4,077,001 each require two input coils on each of the magnetic paths. This advantage of the present invention is significant both in the simplification of hardware and in increasing the efficiency of power conversion.

The right output coil 29 is electrically connected to a rectifier and filter 33, having an output driven through a regulator 34, which provides an output voltage adjustable through the use of a potentiometer 35. The output of the linear regulator 34 is in turn provided as an input to a sensing and switching circuit 36. Under start up conditions, the sensing and switching circuit 36 connects the switching and control circuit 24 to an external power source 38, which is, for example, a starting battery. After the electromagnetic generator 10 is properly started, the sensing and switching circuit 36 senses that the voltage available from regulator 34 has reached a predetermined level, so that the power input to the switching and control circuit 24 is switched from the external power source 38 to the output of regulator 34. After this switching occurs, the electromagnetic generator 10 continues to operate without an application of external power.

The left output coil 30 is electrically connected to a rectifier and filter 40, the output of which is connected to a regulator 42, the output voltage of which is adjusted by means of a potentiometer 43. The output of the regulator 42 is in turn connected to an external load 44.

FIG. 2 is a schematic view of a first version of the switching and control circuit 24. An oscillator 50 drives the clock input of a flip-flop 54, with the Q and Q' outputs of the flip-flop 54 being connected through driver circuits 56, 58 to power FETS 60, 62 so that the input coils 26, 28 are alternately driven. In accordance with a preferred version of the present invention, the voltage V applied to the coils 26, 28 through the FETS 60, 62 is derived from the output of the sensing and switching circuit 36.

FIG. 3 is a graphical view of the signals driving the gates of FETS 60, 62 of FIG. 2, with the voltage of the signal driving the gate of FET 60 being represented by line 64, and with the voltage of the signal driving FET 62 being represented by line 66. Both of the coils 26, 28 are driven with positive voltages.

FIG. 4 is a schematic view of a second version of the switching and control circuit 24. In this version, an oscillator 70 drives the clock input of a flip-flop 72, with the Q and Q' outputs of the flip-flop 72 being connected to serve as triggers for one-shots 74, 76. The outputs of the one-shots 74, 76 are in turn connected through driver circuits 78, 80 to drive FETS 82, 84, so that the input coils 26, 28 are alternately driven with pulses shorter in duration than the Q and Q' outputs of the flip flop 72.

Figure 5:
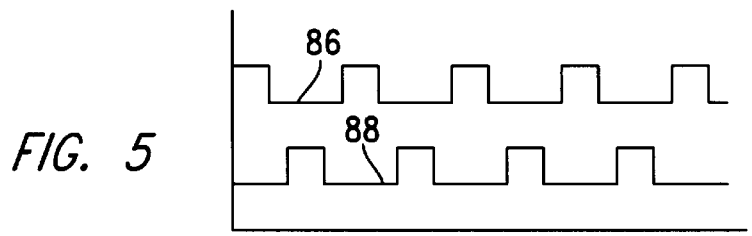
FIG. 5 is a graphical view of drive signals produced within the circuit of FIG. 3.

FIG. 5 is a graphical view of the signals driving the gates of FETS 82, 84 of FIG. 4, with the voltage of the signal driving the gate of FET 82 being represented by line 86, and with the voltage of the signal driving the gate of FET 84 being represented by line 88.

Referring again to FIG. 1, power is generated in the right output coil 29 only when the level of magnetic flux is changing in the right magnetic path 18, and in the left output coil 30 only when the level of magnetic flux is changing in the left magnetic path 20. It is therefore desirable to determine, for a specific magnetic generator configuration, the width of a pulse providing the most rapid practical change in magnetic flux, and then to provide this pulse width either by varying the frequency of the oscillator 50 of the apparatus of FIG. 2, so that this pulse width is provided with the signals shown in FIG. 3, or by varying the time constant of the one-shots 74, 76 of FIG. 4, so that this pulse width is provided by the signals of FIG. 5 at a lower oscillator frequency. In this way, the input coils are not left on longer than necessary. When either of the input coils is left on for a period of time longer than that necessary to produce the change in flux direction, power is being wasted through heating within the input coil without additional generation of power in the corresponding output coil.

A number of experiments have been conducted to determine the adequacy of an electromagnetic generator built as the generator 10 in FIG. 1 to produce power both to drive the switching and control logic, providing power to the input coils 26, 28, and to drive an external load 44. In the configuration used in this experiment, the input coils 26, 28 had 40 turns of 18-gauge copper wire, and the output coils 29, 30 had 450 turns of 18-gauge copper wire. The permanent magnet 12 had a height of 40 mm (1.575 in. between its north and south poles, in the direction of arrow 89, a width of 25.4 mm (1.00 in.), in the direction of arrow 90, and in the other direction, a depth of 38.1 mm (1.50 in.). The core 16 had a height, in the direction of arrow 89, of 90 mm (3.542 in.), a width, in the direction of arrow 90, of 135 mm (5.315 in.) and a depth of 70 mm (2.756 in.). The core 16 had a central hole with a height, in the direction of arrow 89, of 40 mm (1.575 mm) to accommodate the magnet 12, and a width, in the direction of arrow 90, of 85 mm (3.346 in.). The core 16 was fabricated of two "C"-shaped halves, joined at lines 92, to accommodate the winding of output coils 29, 30 and input coils 26, 28 over the core material.

The core material was a laminated iron-based magnetic alloy sold by Honeywell as METGLAS Magnetic Alloy 2605SA1. The magnet material was a combination of iron, neodymium, and boron.

The input coils 26, 28 were driven at an oscillator frequency of 87.5 KHz, which was determined to produce optimum efficiency using a switching control circuit configured as shown in FIG. 2. This frequency has a period of 11.45 microseconds. The flip flop 54 is arranged, for example, to be set and reset on rising edges of the clock signal input from the oscillator, so that each pulse driving one of the FETS 60, 62 has a duration of 11.45 microseconds, and so that sequential pulses are also separated to each FET are also separated by 11.45 microseconds.

Figure 6A:
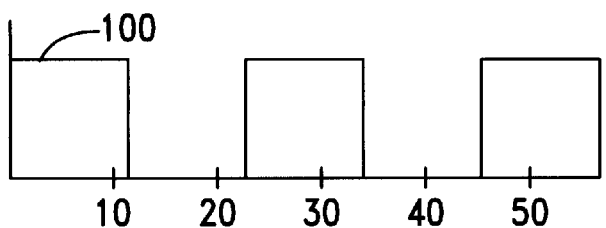
FIG. 6A is a graphical view of a first drive signal within the apparatus of FIG. 1.
Figure 6B:
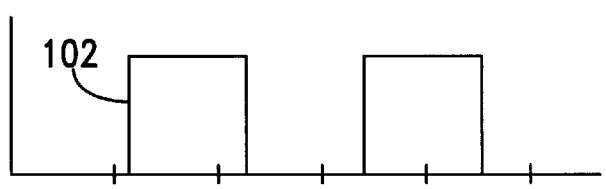
FIG. 6B is a graphical view of a second drive signal within the apparatus of FIG. 1.

FIGS. 6A–6H are graphical views of signals which simultaneously occurred within the apparatus of FIGS. 1 and 2 during operation with an applied input voltage of 75 volts. FIG. 6A shows a first drive signal 100 driving FET 60, which conducts to drive the right input coil 26. FIG. 6B is shows a second drive signal 102 driving FET 62, which conducts to drive the left input coil 28.

Figure 6C:
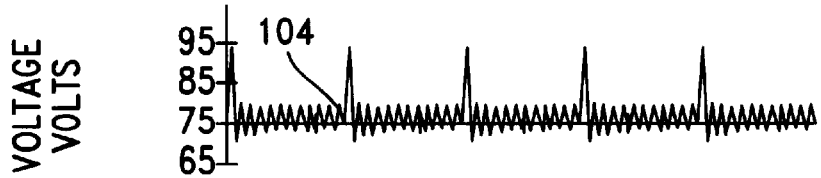
FIG. 6C is a graphical view of an input voltage signal within the apparatus of FIG. 1.
Figure 6D:
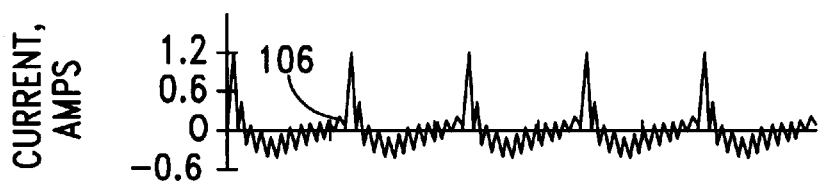
FIG. 6D is a graphical view of an input current signal within the apparatus of FIG. 1.

FIGS. 6C and 6D show voltage and current signals associated with current driving both the FETS 60, 62 from a battery source. FIG. 6C shows the level 104 of voltage V. While the nominal voltage of the battery was 75 volts, a decaying transient signal 106 is superimposed on this voltage each time one of the FETS 60, 62 is switched on to conduct. The specific pattern of this transient signal depends on the internal resistance of the battery, as well as on a number of characteristics of the magnetic generator 10. Similarly, FIG. 6D shows the current 106 flowing into both FETS 60, 62 from the battery source. Since the signals 104, 106 show the effects of current flowing into both FETS 60, 62 the transient spikes are 11.45 microseconds apart.

Figure 6E:
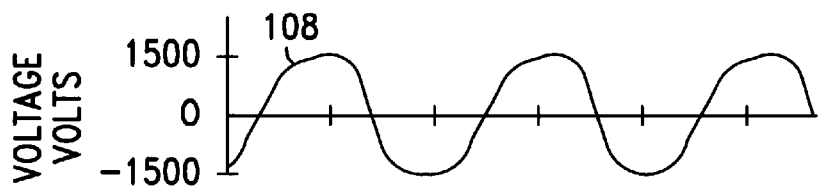
FIG. 6E is a graphical view of a first output voltage signal within the apparatus of FIG. 1.
Figure 6F:
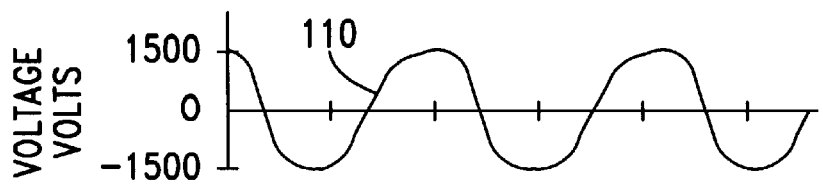
FIG. 6F is a graphical view of a second output voltage signal within the apparatus of FIG. 1.
Figure 6G:
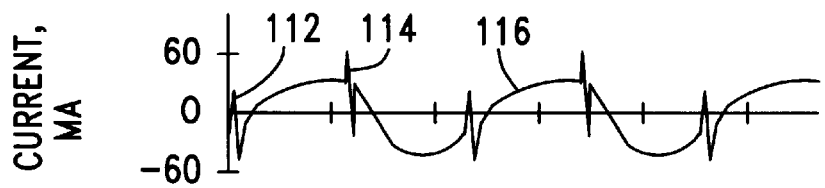
FIG. 6G is a graphical view of a first output current signal within the apparatus of FIG. 1.
Figure 6H:
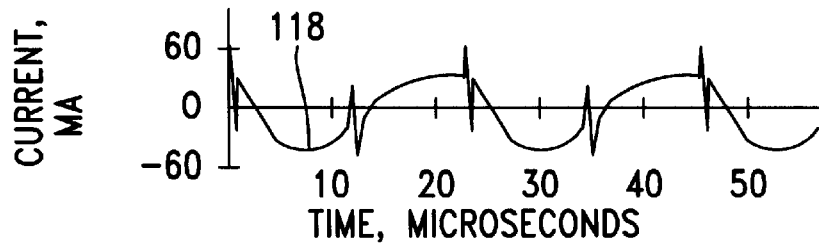
FIG. 6H is a graphical view of a second output current signal within the apparatus of FIG. 1.

FIGS. 6E–6H show voltage and current levels measured at the output coils 29, 30. FIG. 6E shows a voltage output signal 108 of the right output coil 29, while FIG. 6F shows a voltage output signal 110 of the left output coil 30. For example, the output current signal 116 of the right output coil 29 includes a first transient spike 112 caused when the a current pulse in the left input coil 28 is turned on to direct magnetic flux through the right magnetic path 18, and a second transient spike 114 caused when the left input coil 28 is turned off with the right input coil 26 being turned on. FIG. 6G shows a current output signal 116 of the right output coil 29, while FIG. 6H shows a current output signal 118 of the left output coil 30.

Figure 7:
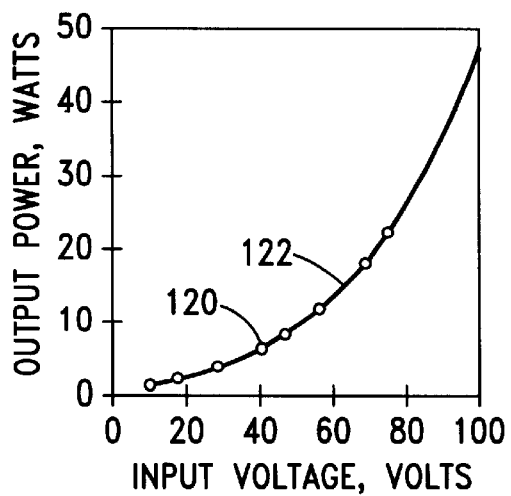
FIG. 7 is a graphical view of output power measured within the apparatus of FIG. 1, as a function of input voltage.

FIG. 7 is a graphical view of output power measured using the electromagnetic generator 10 and eight levels of input voltage, varying from 10v to 75v. The oscillator frequency was retained at 87.5 KHz. The measurement points are represented by indicia 120, while the curve 122 is generated by polynomial regression analysis using a least squares fit.

Figure 8:
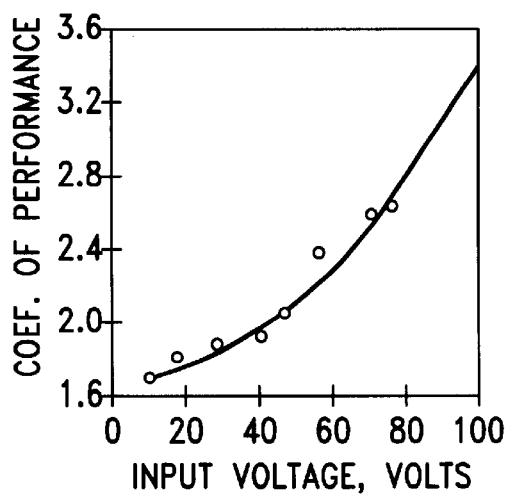
FIG. 8 is a graphical view of a coefficient of performance, calculated from measurements within the apparatus of FIG. 1, as a function of input voltage.

FIG. 8 is a graphical view of a coefficient of performance, defined as the ratio of the output power to the input power, for each of the measurement points shown in FIG. 7. At each measurement point, the output power was substantially higher than the input power. Real power measurements were computed at each data point using measured voltage and current levels, with the results being averaged over the period of the signal. These measurements agree with RMS power measured using a Textronic THS730 digital oscilloscope.

While the electromagnetic generator 10 was capable of operation at much higher voltages and currents without saturation, the input voltage was limited to 75 volts because of voltage limitations of the switching circuits being used. Those skilled in the relevant art will understand that components for switching circuits capable of handling higher voltages in this application are readily available. The experimentally-measured data was extrapolated to describe operation at an input voltage of 100 volts, with the input current being 140 ma, the input power being 14 watts, and with a resulting output power being 48 watts for each of the two output coils 29, 30, at an average output current of 12 ma and an average output voltage of 4000 volts. This means that for each of the output coils 29, 30, the coefficient of performance would be 3.44.

While an output voltage of 4000 volts may be needed for some applications, the output voltage can also be varied through a simple change in the configuration of the electromagnetic generator 10. The output voltage is readily reduced by reducing the number of turns in the output windings. If this number of turns is decreased from 450 to 12, the output voltage is dropped to 106.7, with a resulting increase in output current to 0.5 amps for each output coil 29, 30. In this way, the output current and voltage of the electromagnetic generator can be varied by varying the number of turns of the output coils 29, 30, without making a substantial change in the output power, which is instead determined by the input current, which determines the amount of magnetic flux shuttled during the switching process.

The coefficients of performance, all of which were significantly greater than 1, plotted in FIG. 8 indicate that the output power levels measured in each of the output coils 29, 30 were substantially greater than the corresponding input power levels driving both of the input coils 26, 28. Therefore, it is apparent that the electromagnetic generator 10 can be built in a self-actuating form, as discussed above in reference to FIG. 1. In the example of FIG. 1, except for a brief application of power from the external power source 38, to start the process of power generation, the power required to drive the input coils 26, 28 is derived entirely from power developed within the right output coil 29. If the power generated in a single output coil 29, 30 is more than sufficient to drive the input coils 26, 28, an additional load 126 may be added to be driven with power generated in the output coil 29 used to generate power to drive the input coils 26, 28. On the other hand, each of the output coils 29, 30 may be used to drive a portion of the input coil power requirements, for example with one of the output coils 26, 28 providing the voltage V for the FET 60 (shown in FIG. 2), while the other output coil provides this voltage for the FET 62.

Regarding thermodynamic considerations, it is noted that, when the electromagnetic generator 10 is operating, it is an open system not in thermodynamic equilibrium. The system receives static energy from the magnetic flux of the permanent magnet. Because the electromagnetic generator 10 is self-switched without an additional energy input, the thermodynamic operation of the system is an open dissipative system, receiving, collecting, and dissipating energy from its environment; in this case, from the magnetic flux stored within the permanent magnet. Continued operation of the electromagnetic generator 10 causes demagnetization of the permanent magnet. The use of a magnetic material including rare earth elements, such as a samarium cobalt material or a material including iron, neodymium, and boron is preferable within the present invention, since such a magnetic material has a relatively long life in this application.

Thus, an electromagnetic generator operating in accordance with the present invention should be considered not as a perpetual motion machine, but rather as a system in which flux radiated from a permanent magnet is converted into electricity, which is used both to power the apparatus and to power an external load. This is analogous to a system including a nuclear reactor, in which a number of fuel rods radiate energy which is used to keep the chain reaction going and to heat water for the generation of electricity to drive external loads.

Figure 9:
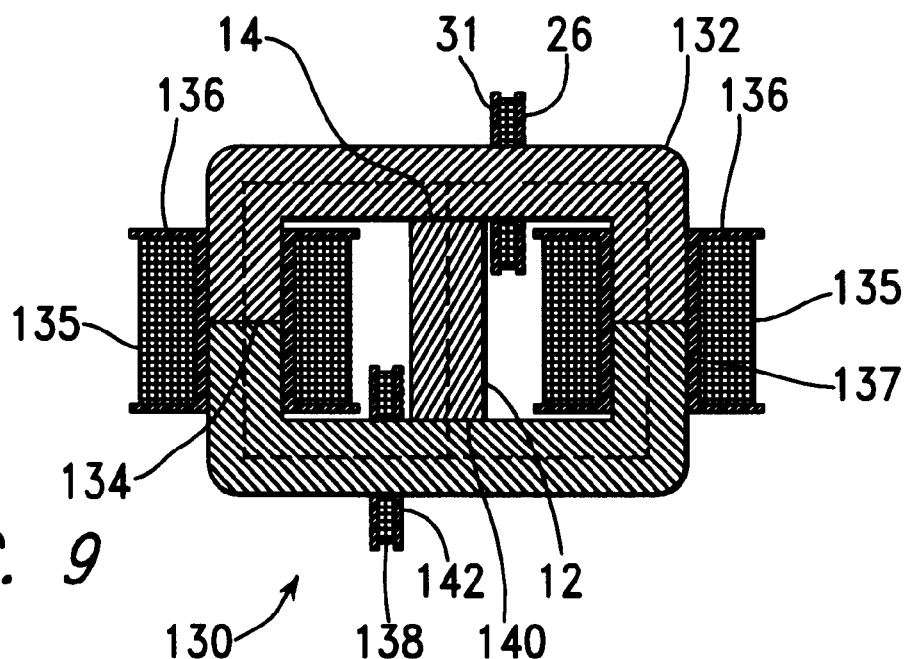
FIG. 9 is a cross-sectional elevation of a second version of the first embodiment of the present invention.

FIG. 9 is a cross-sectional elevation of an electromagnetic generator 130 built in accordance with a second version of the first embodiment of the present invention. This electromagnetic generator 130 is generally similar in construction and operation to the electromagnetic generator 10 built in accordance with the first version of this embodiment, except that the magnetic core 132 of the electromagnetic generator 10 is built in two halves joined along lines 134, allowing each of the output coils 135 to be wound on a plastic bobbin 136 before the bobbin 136 is placed over the legs 137 of the core 132. FIG. 9 also shows an alternate placement of an input coil 138. In the example of FIG. 1, both input coils 26, 28 were placed on the upper portion of the magnetic core 16, with these coils 26, 28 being configured to establish magnetic fields having north magnetic poles at the inner ends 31, 32 of the coils 26, 28, with these north magnetic poles thus being closest to the end 14 of the permanent magnet 12 having its north magnetic pole. In the example of FIG. 9, a first input coil 26 is as described above in reference to FIG. 1, but the second input coil 138 is placed adjacent the south pole 140 of the permanent magnet 12. This input coil 138 is configured to establish a south magnetic pole at its inner end 142, so that, when input coil 138 is turned on, flux from the permanent magnet 12 is directed away from the left magnetic path 20 into the right magnetic path 18.

Figure 10:
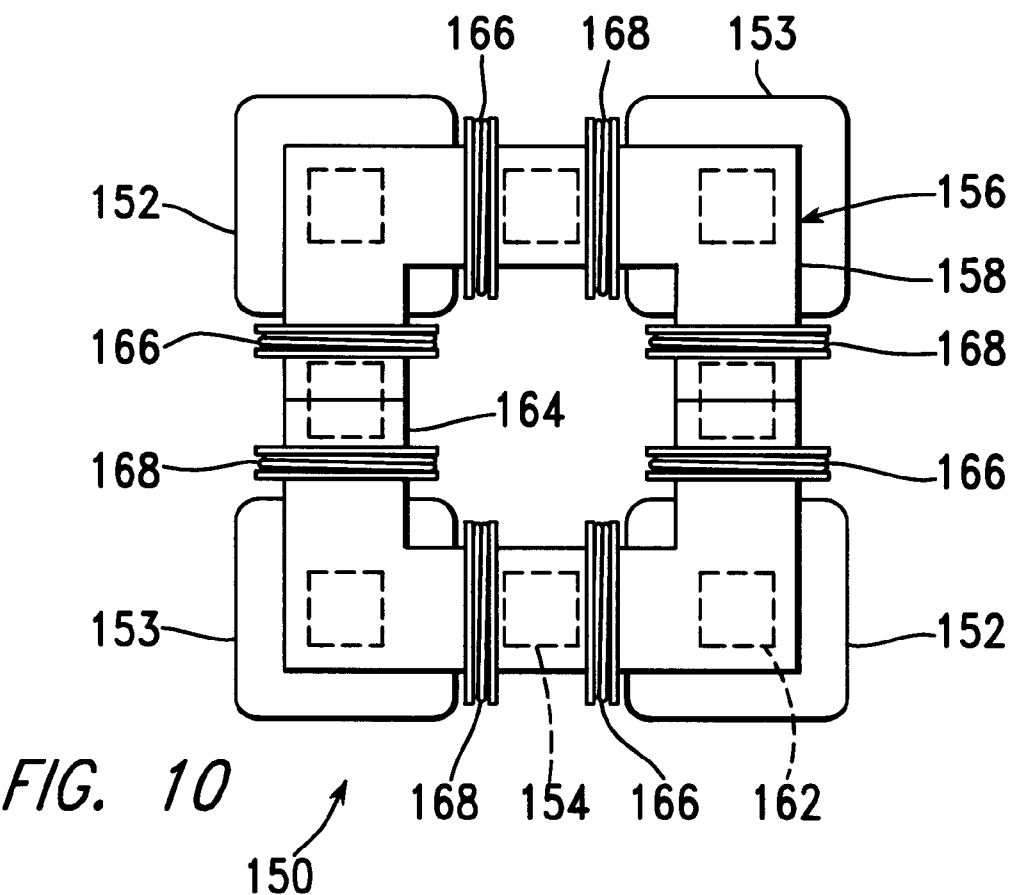
FIG. 10 is a top view of a magnetic generator built in accordance with a first version of a second embodiment of the present invention.
Figure 11:
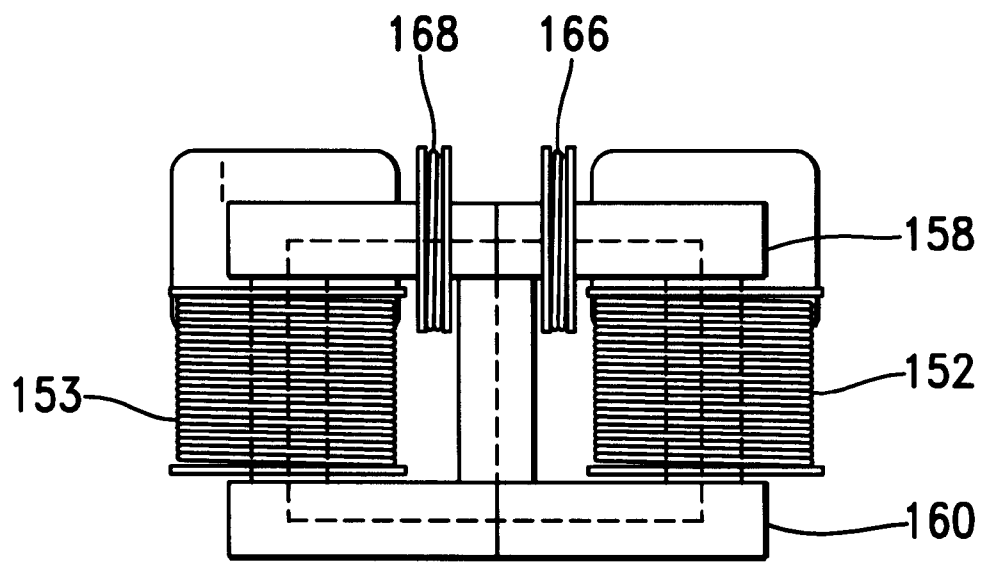
FIG. 11 is a front elevation of the magnetic generator of FIG. 10.

FIGS. 10 and 11 show an electromagnetic generator 150 built in accordance with a first version of a second embodiment of the present invention, with FIG. 10 being a top view thereof, and with FIG. 11 being a front elevation thereof. This electromagnetic generator 150 includes an output coil 152, 153 at each corner, and a permanent magnet 154 extending along each side between output coils. The magnetic core 156 includes an upper plate 158, a lower plate 160, and a square post 162 extending within each output coil 152, 153. Both the upper plate 158 and the lower plate 160 include central apertures 164.

Each of the permanent magnets 154 is oriented with a like pole, such as a north pole, against the upper plate 158. Eight input coils 166, 168 are placed in positions around the upper plate 158 between an output coil 152, 153 and a permanent magnet 154. Each input coil 166, 168 is arranged to form a magnetic pole at its end nearest to the adjacent permanent magnet 154 of a like polarity to the magnetic poles of the magnets 154 adjacent the upper plate 158. Thus, the input coils 166 are switched on to divert magnetic flux of the permanent magnets 154 from the adjacent output coils 152, with this flux being diverted into magnetic paths through the output coils 153. Then, the input coils 168 are switched on to divert magnetic flux of the permanent magnets 154 from the adjacent output coils 153, with this flux being diverted into magnetic paths through the output coils 152. Thus, the input coils form a first group of input coils 166 and a second group of input coils 168, with these first and second groups of input coils being alternately energized in the manner described above in reference to FIG. 1 for the single input coils 26, 28. The output coils produce current in a first train of pulses occurring simultaneously within coils 152 and in a second train of pulses occurring simultaneously within coils 153.

Thus, driving current through input coils 166 causes an increase in flux from the permanent magnets 154 within the posts 162 extending through output coils 153 and a decrease in flux from the permanent magnets 154 within the posts 162 extending through output coils 152. On the other hand, driving current through input coils 168 causes a decrease in flux from the permanent magnets 154 within the posts 162 extending through output coils 153 and an increase in flux from the permanent magnets 154 within the posts 162 extending through output coils 152.

While the example of FIGS. 10 and 11 shows all of the input coils 166,168 deployed along the upper plate 158, it is understood that certain of these input coils 166, 168 could alternately be deployed around the lower plate 160, in the manner generally shown in FIG. 9, with one input coil 166, 168 being within each magnetic circuit between a permanent magnet 154 and an adjacent post 162 extending within an output coil 152, 153, and with each input coil 166, 168 being arranged to produce a magnetic field having a magnetic pole like the closest pole of the adjacent permanent magnet 154.

Figure 12:
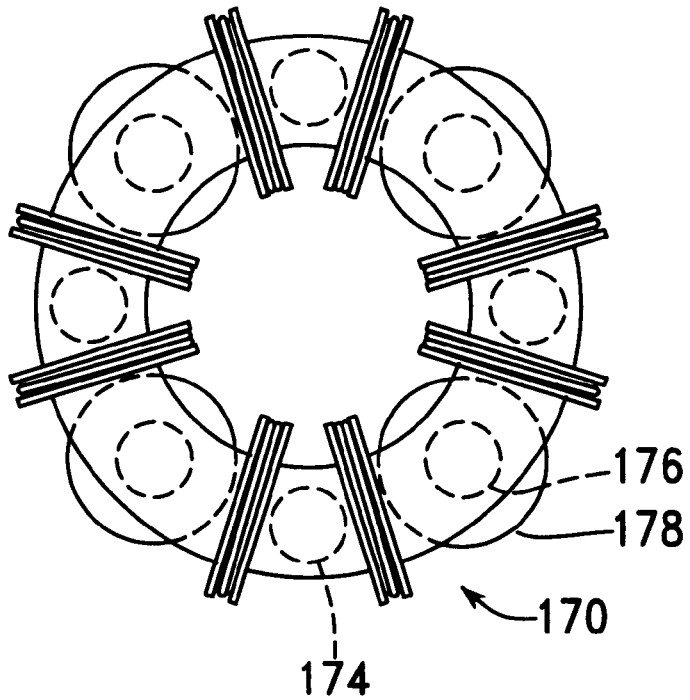
FIG. 12 is a top view of a magnetic generator built in accordance with a second version of the second embodiment of the present invention.

FIG. 12 is a top view of a second version 170 of the second embodiment of the present invention, which is similar to the first version thereof, which has been discussed in reference to FIGS. 10 and 11, except that an upper plate 172 and a similar lower plate (not shown) are annular in shape, while the permanent magnets 174 and posts 176 extending through the output coils 178 are cylindrical. The input coils 180 are oriented and switched as described above in reference to FIGS. 9 and 10.

While the example of FIG. 12 shows four permanent magnets, four output coils and eight input coils it is understood that the principles described above can be applied to electromagnetic generators having different numbers of elements. For example, such a device can be built to have two permanent magnets, two output coils, and four input coils, or to have six permanent magnets, six output coils, and twelve input coils.

In accordance with the present invention, material used for magnetic cores is preferably a nanocrystalline alloy, and alternately an amorphous alloy. The material is preferably in a laminated form. For example, the core material is a cobalt-niobium-boron alloy or an iron based magnetic alloy.

Also in accordance with the present invention, the permanent magnet material preferably includes a rare earth element. For example, the permanent magnet material is a samarium cobalt material or a combination of iron, neodymium, and boron.

While the invention has been described in its preferred versions and embodiments with some degree of particularity, it is understood that this description has been given only by way of example and that numerous changes in the details of construction, fabrication, and use, including the combination and arrangement of parts, may be made without departing from the spirit and scope of the invention.

What is claimed is:

1. An electromagnetic generator comprising:
   a permanent magnet having magnetic poles at opposite ends;
   a magnetic core including first and second magnetic paths between said opposite ends of said permanent magnet, wherein
      said magnetic core comprises a closed loop,
      said permanent magnet extends within said closed loop, and
      said opposite ends of said permanent magnet are disposed adjacent opposite sides of said closed loop and against internal surfaces of said magnetic core comprising said closed loop;
   a first input coil extending around a portion of said first magnetic path,
   a second input coil extending around a portion of said second magnetic path,
   a first output coil extending around a portion of said first magnetic path for providing a first electrical output;
   a second output coil extending around a portion of said second magnetic path for providing a second electrical output; and
   a switching circuit driving electrical current alternately through said first and second input coils, wherein
      said electrical current driven through said first input coil causes said first input coil to produce a magnetic field opposing a concentration of magnetic flux from said permanent magnet within said first magnetic path, and
      said electrical current driven through said second input coil causes said second input coil to produce a magnetic field opposing a concentration of magnetic flux from said permanent magnet within said second magnetic path.

2. An electromagnetic generator comprising:
   a permanent magnet having magnetic poles at opposite ends;
   a magnetic core including first and second magnetic paths between said opposite ends of said permanent magnet, wherein
      said magnetic core comprises a closed loop,
      said permanent magnet extends within said closed loop,
      said opposite ends of said permanent magnet are disposed adjacent opposite sides of said closed loop, and
      a first type of pole of said permanent magnet is disposed adjacent a first side of said closed loop;
   a first input coil, disposed along said first side of said closed loop, extending around a portion of said first magnetic path,
   a second input coil, disposed along said first side of said closed loop, extending around a portion of said second magnetic path,
   a first output coil extending around a portion of said first magnetic path for providing a first electrical output;
   a second output coil extending around a portion of said second magnetic path for providing a second electrical output; and
   a switching circuit driving electrical current alternately through said first and second input coils, wherein
      said electrical current driven through said first input coil causes said first input coil to produce a magnetic field opposing a concentration of magnetic flux from said permanent magnet within said first magnetic path, and additionally causes said first input coil to produce a magnetic field having said first type of pole at an end of said first input coil adjacent said permanent magnet, and
      said electrical current driven through said second input coil causes said second input coil to produce a magnetic field opposing a concentration of magnetic flux from said permanent magnet within said second magnetic path, and additionally causes said second input coil to produce a magnetic field having said first type of pole at an end of said of said second input coil adjacent said permanent magnet.

3. An electromagnetic generator comprising:
   a permanent magnet having magnetic poles at opposite ends;
   a magnetic core including first and second magnetic paths between said opposite ends of said permanent magnet, wherein
      said magnetic core comprises a closed loop,
      said permanent magnet extends within said closed loop, and
      said opposite ends of said permanent magnet are disposed adjacent opposite sides of said closed loop,
      a first type of pole of said permanent magnet is disposed adjacent a first side of said closed loop, and
      a second type of pole, opposite said first type of pole, of said permanent magnet is disposed adjacent a second side of said closed loop;
   a first input coil extending around a portion of said first magnetic path, wherein said first input coil is disposed along said first side of said closed loop;
   a second input coil extending around a portion of said second magnetic path wherein said second input coil is disposed along said second side of said closed loop;
   a first output coil extending around a portion of said first magnetic path for providing a first electrical output;
   a second output coil extending around a portion of said second magnetic path for providing a second electrical output; and
   a switching circuit driving electrical current alternately through said first and second input coils, wherein
      said electrical current driven through said first input coil causes said first input coil to produce a magnetic field opposing a concentration of magnetic flux from said permanent magnet within said first magnetic path, and additionally causes said first input coil to produce a magnetic field having said first type of pole at an end of said first input coil adjacent said permanent magnet, and
      said electrical current driven through said second input coil causes said second input coil to produce a magnetic field opposing a concentration of magnetic flux from said permanent magnet within said second magnetic path, and additionally causes said second input coil to produce a magnetic field having said second type of pole at an end of said of said second input coil adjacent said permanent magnet.

4. An electromagnetic generator comprising:
   a permanent magnet having magnetic poles at opposite ends;
   a magnetic core including first and second magnetic paths between said opposite ends of said permanent magnet;

a first input coil extending around a portion of said first magnetic path, a second input coil extending around a portion of said second magnetic path, a first output coil extending around a portion of said first magnetic path for providing a first electrical output;

a second output coil extending around a portion of said second magnetic path for providing a second electrical output; and a switching circuit driving electrical current alternately through said first and second input coils, wherein said electrical current driven through said first input coil causes said first input coil to produce a magnetic field opposing a concentration of magnetic flux from said permanent magnet within said first magnetic path, and wherein said electrical current driven through said second input coil causes said second input coil to produce a magnetic field opposing a concentration of magnetic flux from said permanent magnet within said second magnetic path, wherein a portion of electrical power induced in said first output coil provides power to drive said switching circuit.

5. The electromagnetic generator of claim 4, wherein said switching circuit is driven by an external power source during a starting process and by power induced in said first output coil during operation after said starting process.

6. The electromagnetic generator of claim 2, wherein said magnetic core is composed of a nanocrystalline magnetic alloy.

7. The electromagnetic generator of claim 6, wherein said nanocrystalline magnetic alloy is a cobalt-niobium-boron alloy.

8. The electromagnetic generator of claim 6, wherein said nanocrystalline magnetic alloy is an iron-based alloy.

9. The electromagnetic generator of claim 2, wherein said changes in flux density within said magnetic core occur without driving said magnetic core to magnetic saturation.

10. The electromagnetic generator of claim 2, wherein said switching circuit drives said electrical current through said first input coil in response to a first train of pulses, said switching circuit drives said electrical current through said second input coil in response to a second train of pulses, alternating with pulses within said first train of pulses, and said pulses in said first and second trains of pulses are approximately 11.5 milliseconds in duration.

11. The electromagnetic generator of claim 2, wherein said permanent magnet is composed of a material including a rare earth element.

12. The electromagnetic generator of claim 11, wherein said permanent magnet is composed essentially of samarium cobalt.

13. The electromagnetic generator of claim 11, wherein said permanent magnet is composed essentially of iron, neodymium, and boron.

14. An electromagnetic generator comprising:

a magnetic core including a pair of spaced-apart plates, wherein each of said spaced-apart plates includes a central aperture, and first and second pluralities of posts extending between said spaced-apart plates;

a plurality of permanent magnets extending individually between said pair of spaced-apart plates and between adjacent posts within said plurality of posts, wherein each permanent magnet within said plurality of permanent magnets has magnetic poles at opposite ends, wherein all magnets within said plurality of magnets are oriented to produce magnetic fields having a common direction;

first and second pluralities of input coils, wherein each input coil within said first and second pluralities of input coils extends around a portion of a plate within said spaced-apart plates between a post in said plurality of posts and a permanent magnet in said plurality of permanent magnets;

an output coil extending around each post in said first and second pluralities of posts for providing an electrical output;

a switching circuit driving electrical current alternatively through said first and second pluralities of input coils, wherein said electrical current driven through each input coil in said first plurality of input coils causes an increase in magnetic flux within each post within said first plurality of posts from permanent magnets on each side of said post and a decrease in magnetic flux within each post within said second plurality of posts from permanent magnets on each side of said post, and wherein said electrical current driven through input coil in said second plurality of input coils causes a decrease in magnetic flux within each post within said first plurality of posts from permanent magnets on each side of said post and an increase in magnetic flux within each post within said second plurality of posts from permanent magnets on each side of said post.

15. The electromagnetic generator of claim 14, wherein each input coil extends around a portion of a magnetic path through said magnetic core between said opposite ends a permanent magnet adjacent said input coil, said magnetic path extends through a post within said magnetic core adjacent said input coil, and driving electrical current through said input coil causes said input coil to produce a magnetic field opposing a concentration of magnetic flux within said magnetic path.

16. The electromagnetic generator of claim 14, wherein said switching circuit is driven by an external power source during a starting process and by power induced in said output coils during operation after said starting process.

17. The electromagnetic generator of claim 14, wherein said magnetic core is composed of a nanocrystalline magnetic alloy.

18. The electromagnetic generator of claim 2, wherein a portion of electrical power induced in said first output coil provides power to drive said switching circuit.

19. The electromagnetic generator of claim 18, wherein said switching circuit is driven by an external power source during a starting process and by power induced in said first output coil during operation after said starting process.

20. The electromagnetic generator of claim 3, wherein a portion of electrical power induced in said first output coil provides power to drive said switching circuit.

21. The electromagnetic generator of claim 20, wherein said switching circuit is driven by an external power source during a starting process and by power induced in said first output coil during operation after said starting process.

22. The electromagnetic generator of claim 3, wherein said magnetic core is composed of a nanocrystalline magnetic alloy.

23. The electromagnetic generator of claim 22, wherein said nanocrystalline magnetic alloy is a cobalt-niobium-boron alloy.

24. The electromagnetic generator of claim 22, wherein said nanocrystalline magnetic alloy is an iron-based alloy.

25. The electromagnetic generator of claim 3, wherein said changes in flux density within said magnetic core occur without driving said magnetic core to magnetic saturation.

26. The electromagnetic generator of claim 3, wherein
   said switching circuit drives said electrical current through said first input coil in response to a first train of pulses,
   said switching circuit drives said electrical current through said second input coil in response to a second train of pulses, alternating with pulses within said first train of pulses, and
   said pulses in said first and second trains of pulses are approximately 11.5 milliseconds in duration.

27. The electromagnetic generator of claim 3, wherein said permanent magnet is composed of a material including a rare earth element.

28. The electromagnetic generator of claim 27, wherein said permanent magnet is composed essentially of samarium cobalt.

29. The electromagnetic generator of claim 27, wherein said permanent magnet is composed essentially of iron, neodymium, and boron.

* * * * *